United States Patent
Choudhary et al.

(10) Patent No.: US 12,373,279 B2
(45) Date of Patent: Jul. 29, 2025

(54) SELECTION OF PROCESSING MODE FOR RECEIVER CIRCUIT

(71) Applicant: Intel Corporation, Santa Clara, CA (US)

(72) Inventors: Swadesh Choudhary, Mountain View, CA (US); Debendra Das Sharma, Saratoga, CA (US); Michelle Jen, Mountain View, CA (US)

(73) Assignee: Intel Corporation, Santa Clara, CA (US)

( * ) Notice: Subject to any disclaimer, the term of this patent is extended or adjusted under 35 U.S.C. 154(b) by 611 days.

(21) Appl. No.: 17/645,828

(22) Filed: Dec. 23, 2021

(65) Prior Publication Data
US 2022/0308954 A1    Sep. 29, 2022

Related U.S. Application Data

(60) Provisional application No. 63/242,421, filed on Sep. 9, 2021.

(51) Int. Cl.
  *G06F 11/00* (2006.01)
  *G06F 11/07* (2006.01)
  *G06F 13/36* (2006.01)

(52) U.S. Cl.
  CPC ...... *G06F 11/0793* (2013.01); *G06F 11/0745* (2013.01); *G06F 13/36* (2013.01)

(58) Field of Classification Search
  None
  See application file for complete search history.

(56) References Cited

U.S. PATENT DOCUMENTS

| | | | |
|---|---|---|---|
| 9,148,252 B2* | 9/2015 | Wang | H04L 1/0057 |
| 2003/0046601 A1 | 3/2003 | Teng | |
| 2003/0156650 A1* | 8/2003 | Campisano | H04N 21/44004 |
| | | | 375/E7.095 |
| 2006/0129728 A1 | 6/2006 | Hampel | |
| 2010/0050035 A1 | 2/2010 | Hong et al. | |
| 2010/0107008 A1 | 4/2010 | Radulescu et al. | |
| 2011/0093628 A1* | 4/2011 | Bulgin | G06F 5/14 |
| | | | 710/56 |
| 2015/0121166 A1* | 4/2015 | Goodman | G11C 29/44 |
| | | | 714/764 |

(Continued)

FOREIGN PATENT DOCUMENTS

EP    3829090 A1    6/2021

OTHER PUBLICATIONS

European Patent Office, Extended European Search Report for Appl. No. 22188188.1 dated Apr. 5, 2023 (12 pages).
Patent Cooperation Treaty, International Search Report and Written Opinion mailed Jan. 5, 2022 in PCT Application No. PCT/US2021/050772 (12 pages).
Intel Corporation, Logical PHY Interface (LPIF) Specification, Version 1, Mar. 23, 2019, pp. 1-63.

(Continued)

*Primary Examiner* — Mujtaba M Chaudry
(74) *Attorney, Agent, or Firm* — Eversheds Sutherland (US) LLP

(57) ABSTRACT

In an embodiment, an apparatus includes a receiver circuit to: in response to a determination that the receiver circuit is in a high latency processing mode, transmit a hint signal to a transmitter circuit; receive a response message from the transmitter circuit; process the response message to reduce a current workload of the receiver circuit; and switch the receiver circuit from the high latency processing mode to a low latency processing mode. Other embodiments are described and claimed.

14 Claims, 11 Drawing Sheets

(56) References Cited

U.S. PATENT DOCUMENTS

| | | |
|---|---|---|
| 2016/0062669 A1 | 3/2016 | Chu et al. |
| 2017/0097867 A1 | 4/2017 | Glaser et al. |
| 2018/0165240 A1* | 6/2018 | Reinig ................ G06F 13/4022 |
| 2019/0258600 A1* | 8/2019 | Das Sharma ....... G06F 11/0778 |
| 2019/0297018 A1* | 9/2019 | Dearth .................... H04L 47/12 |
| 2020/0186414 A1 | 6/2020 | Sharma |
| 2020/0293480 A1 | 9/2020 | Iyer et al. |
| 2020/0394150 A1 | 12/2020 | Lanka et al. |
| 2021/0011864 A1 | 1/2021 | Bernat et al. |
| 2021/0013999 A1 | 1/2021 | Choudhary et al. |
| 2021/0112132 A1 | 4/2021 | Paliwal et al. |
| 2021/0232520 A1 | 7/2021 | Choudhary et al. |
| 2021/0320820 A1* | 10/2021 | Ruan .................... H04L 49/602 |
| 2021/0349512 A1 | 11/2021 | Bernat et al. |
| 2022/0310178 A1* | 9/2022 | Yang ................. G11C 16/3404 |

OTHER PUBLICATIONS

Intel Corporation, "Compute Express Link, Specification, Mar. 2019, Revision 1.0," Mar. 2019, 206 pages.

Intel Corporation, Compute Express Link™ 2.0 White Paper, 4 pages.

Das Sharma et al., U.S. Appl. No. 17/645,481 entitled System, Apparatus and Methods for Performing Shared Memory Operations filed Dec. 22, 2021 (40 pages).

Blankenship et al., U.S. Appl. No. 17/645,485 entitled System, Apparatus and Methods for Direct Data Reads From Memory filed Dec. 22, 2021 (43 pages).

European Patent Office, Partial European Search Report for Appl. No. 22188188.1 dated Jan. 5, 2023 (13 pages).

Korean Intellectual Property Office, International Search Report and Written Opinion for Appl. No. PCT/US2022/041440 dated Dec. 16, 2022 (10 pages).

\* cited by examiner

| DT | 410 | 420 |
|---|---|---|
| →430→ | AvgR | 11 |
| | AvgR/2 | 8 |
| | AvgR/4 | 6 |
| | AvgR/8 | 4 |
| | AvgR/16 | 2 |
| | AvgR/32 | 0 |

Look-up Table 350

FIG. 4

SELECTION OF PROCESSING MODE FOR RECEIVER CIRCUIT

This application claims priority to U.S. Provisional Patent Application No. 63/242,421, filed on Sep. 9, 2021, in the names of Swadesh Choudhary, Debendra Das Sharma and Michelle Jen, entitled "Latency Improvement for PCIE/CXL/UPI—NOP Hint and RX Replay Buffer Draining," the disclosure of which is hereby incorporated by reference.

BACKGROUND

Computer systems may include any number of components, such as a central processing unit (CPU), memory, chipsets, and/or many other devices coupled together by a computer bus. The computer bus may transfer data between devices or components inside a computer, as well as between computers. The computer bus may implement one or more communication protocols.

BRIEF DESCRIPTION OF THE DRAWINGS

FIG. 4 is an illustration of an example operation in accordance with one or more embodiments.

DETAILED DESCRIPTION

Figure 1:
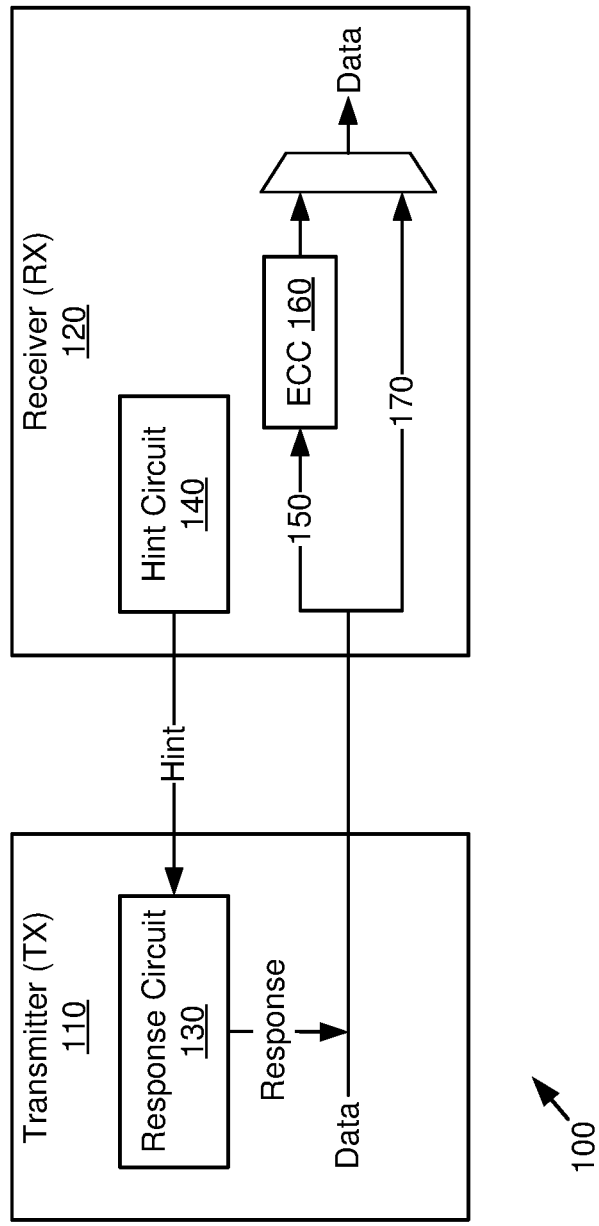
FIG. 1 is a block diagram of an example system in accordance with one or more embodiments.

Computing systems may implement various communication protocols. For example, a communication link between a transmitter and a receiver may implement a compute express link (CXL) protocol, an ultra path interconnect (UPI) protocol, and so forth. The receiver may receive data units (e.g., packets, flits, etc.) via the link, and may process the received data units. Such processing may include performing correction processing (e.g., forward error correction (FEC)) to correct errors that may occur in transmission. However, such error correction may introduce latency into the processing of the received data unit. As used herein, the term "high latency processing mode" may refer to processing of received data by performing error correction. To reduce such latency, some communication protocols may provide bypass formats or other mechanisms that allow processing to occur without error correction. As used herein, the term "low latency processing mode" may refer to processing of received data without performing error correction. However, in the event of a bit error, the receiver may be forced to switch from the low latency processing mode to the high low latency processing mode. Further, under heavy traffic load, the frequency of bit errors may cause the receiver to spend the majority of operating time in the high latency processing mode. Accordingly, in such situations, the receiver may not benefit from the low latency provided by the bypass formats. By way of example, if a bit error rate (BER) is 1e-6, a bit error is expected every 400-500 flits. The skip ordered set (SOS) insertion frequency for a x16 link may be every 740-750 flits. As such, it may not be effective to rely on SOS insertion to switch over from the high latency mode to the low latency mode. Further, if an error occurs every 500 flits, and we assume that an error on average happens 250 flits after the link switches modes, then the system may spend 500 flits out of a possible 750 flits (e.g., 66% of the time) in the high latency mode.

Further, some communication links may implement receiver replay buffers. For example, if an uncorrectable error is detected and the receiver has sufficient space in its replay buffer, it can choose to do a selective NAK only for the data element in error, while storing data for the subsequent flits in the replay buffer. Once the erroneous flit is replayed, the receiver can read out the subsequent flits from the replay buffer. In this manner, the replay buffer may minimize the chance of a full sequence number replay in order to save overall link bandwidth. However, if the receiver spends a substantial amount of time writing into and reading out of the replay buffer, it may incur additional cost of the latency associated with passing through the replay buffer.

Some embodiments described herein may allow a receiver to switch over to the low latency operating mode deterministically. For example, some embodiments may provide include a mechanism for a receiver to send a hint signal to cause a transmitter to insert no-operation (NOP) message when the receiver is in the high latency operating mode. The NOP message may allow the receiver to switch over to the low latency operating mode. Further, some embodiments described herein may provide a mechanism for the transmitter to monitor replay characteristics and adjust the number of transmitted NOP messages, and thereby improve utilization of link throughput and reduce the chances of a full replay.

FIG. 1—Example System

Referring now to FIG. 1, shown is a block diagram of an example system 100 in accordance with one or more embodiments. The system 100 may include a transmitter (TX) circuit 110 transmitting data units (e.g., flits) to a receiver (RX) circuit 120 via a link. In some embodiments, the transmitter circuit 110 may include a response circuit 130, and the receiver circuit 120 may include a hint circuit 140. The transmitter circuit 110, the receiver circuit 120, the response circuit 130, and the hint circuit 140 may include hardware (e.g., processing device, circuitry, dedicated logic, programmable logic, microcode, etc.), software (e.g., instructions run on a processing device), firmware, or a combination thereof.

In some embodiments, the receiver circuit 120 may include two paths for processing received data, namely a high latency path 150 and a low latency path 170. As shown in FIG. 1, the high latency path 150 may include performing error correction on the processed data using an error correction circuit (ECC) 160. As such, using the high latency path 150 may incur a higher latency that using the low latency path 170 that does not include performing error correction. The receiver circuit 120 may selectively operate in one of two processing modes, namely the high latency processing mode when using the high latency path 150, and the low latency processing mode when using the low latency path 170.

In some embodiments, the hint circuit 140 may generate a hint message ("Hint") based on operating characteristics of the receiver circuit 120, and may transmit the hint message to the transmitter circuit 110. The hint message may be a signal or data element indicating that the receiver circuit 120 is ready to switch from the high latency processing mode to the low latency processing mode. For example, the hint message may comprise a special bit that is set in a flit header. In another example, the hint message may comprise sending a specialized flit that is only used as a hint message. In yet another example, the hint message may comprise an overloaded acknowledgement-signal (ACK) or a negative-acknowledgement signal (NACK) with a 0 value, which may provide better bit and bandwidth efficiency than the other examples described above.

In some embodiments, the hint circuit 140 may generate and transmit the hint message when certain conditions are met in the receiver circuit 120. For example, the hint message may be transmitted when the receiver circuit 120 is operating in a normal flit exchange phase, is currently operating in the high latency operating mode (e.g., is currently processing received flits in the high latency path 150), and no hint message has been sent in a recent period of a defined length (e.g., the last 250 flits, the last 500 flits, and so forth). The length of the recent period may be a configurable setting of the system 100.

In some embodiments, the response circuit 130 may receive or detect the hint message, and may cause a response message to be transmitted to the receiver circuit 120. The response message may include one NOP flit or a set of multiple consecutive NOP flits, and may be inserted in the data stream transmitted to the receiver circuit 120 via the link. The number of NOP flits included in the response message may be a configurable setting of the system 100.

In some embodiments, the NOP flits in the response message may cause the high latency path 150 to be "drained" of pending work (i.e., to complete all pending work). In this manner, receiving the response message may allow the receiver circuit 120 to switch from the high latency path 150 to the low latency path 170. In some embodiments, the bandwidth loss caused by one NOP flit may be less that the latency savings associated with using the low latency path 170. Accordingly, the hint circuit 140 and response circuit 130 may provide significant latency savings in high link utilization scenarios. In some embodiments, the hint circuit 140 and/or the response circuit 130 may be selectively disabled to operate the system 100 in a conventional mode if desired in some applications (e.g., if link utilization is prioritized over latency for a given application).

Figure 2:
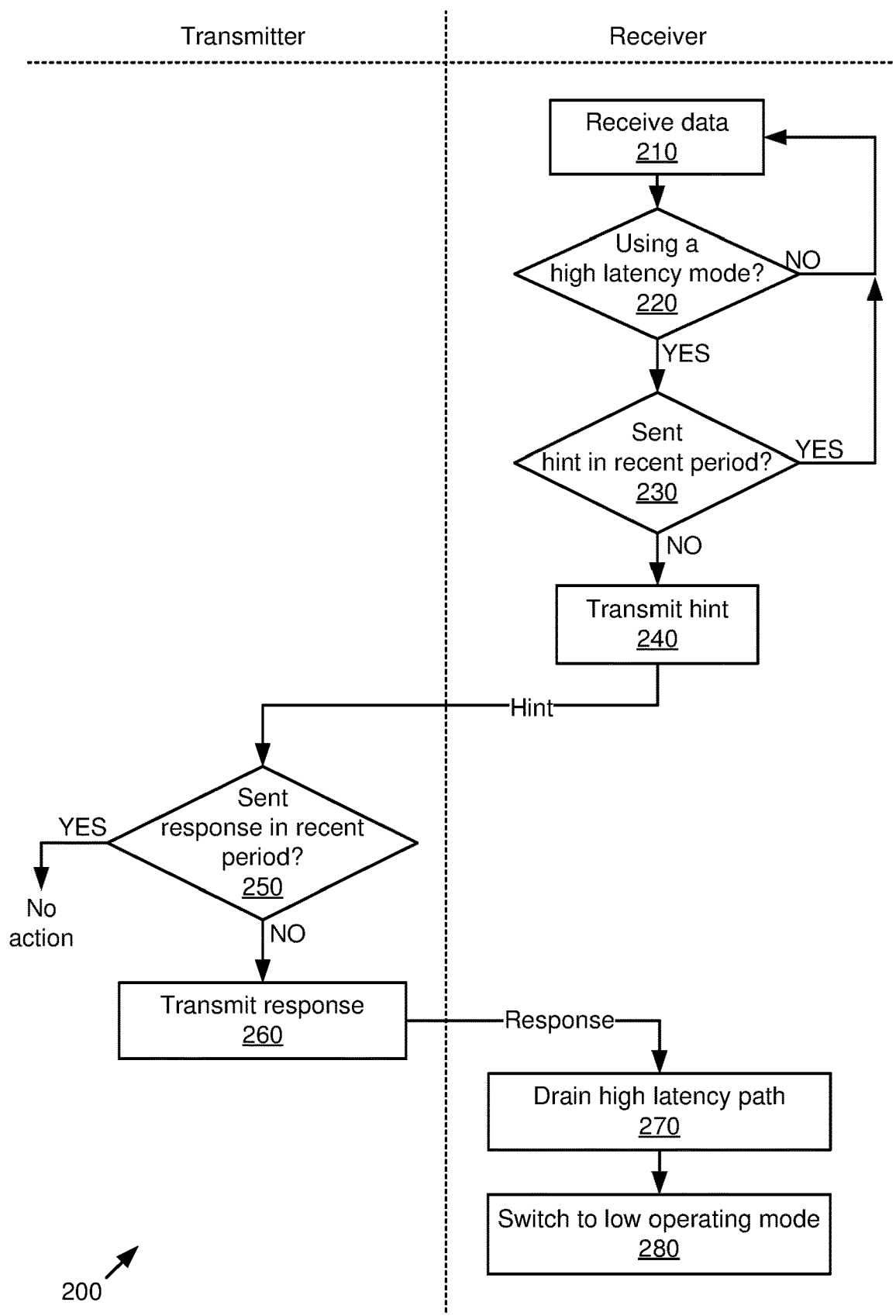
FIG. 2 is a flow diagram of an example method in accordance with one or more embodiments.

FIG. 2—Example Method

Referring now to FIG. 2, shown is a flow diagram of a method 200, in accordance with one or more embodiments. In various embodiments, the method 200 may be performed by processing logic (e.g., transmitter circuit 110, receiver circuit 120, response circuit 130, and/or hint circuit 140 shown in FIG. 1) that may include hardware (e.g., processing device, circuitry, dedicated logic, programmable logic, microcode, etc.), software and/or firmware (e.g., instructions run on a processing device), or a combination thereof. In firmware or software embodiments, the method 200 may be implemented by computer executed instructions stored in a non-transitory machine-readable medium, such as an optical, semiconductor, or magnetic storage device. The machine-readable medium may store data, which if used by at least one machine, causes the at least one machine to fabricate at least one integrated circuit to perform a method.

Block 210 may include receiving data by a receiver. Decision block 220 may include determining whether the receiver is currently using a high latency operating mode. If not, the method 200 may return to block 210. Otherwise, if it is determined that the receiver is currently using a high latency operating mode, then the method 200 may continue at decision block 230, including determining whether the receiver has sent a hint message in a recent period. If so, the method 200 may return to block 210. Otherwise, if it is determined that the receiver has not sent a hint message in a recent period, then the method 200 may continue at block 240, including transmitting a hint message to a transmitter. For example, referring to FIG. 1, the hint circuit 140 may transmit a hint message in response to determining that the receiver circuit 120 is operating in the high latency operating mode (e.g., is currently processing received flits in the high latency path 150) and has not sent any hint message in a recent period (e.g., in the last two hundred flits).

Referring again to FIG. 2, decision block 250 may include determining whether the transmitter has sent a response message in a recent period. If so, then no action is taken by the transmitter in response to the hint message. Otherwise, if it is determined that the transmitter has not sent a response message in a recent period, then the method 200 may continue at block 260, including transmitting a response message to the receiver. In some embodiments, the response message may include a set of one or more multiple consecutive NOP flits. For example, referring to FIG. 1, the response circuit 130 may receive the hint message from the hint circuit 140, and in response may cause a response message to be transmitted to the receiver circuit 120. The response message may include one or more NOP flits, and may be inserted in the data stream transmitted to the receiver circuit 120 via the link.

Referring again to FIG. 2, block 270 may include the receiver draining the high latency path using the NOP message. Block 280 may include the receiver switching from the high latency path to the low latency path. After block 280, the method 200 may be completed. For example, referring to FIG. 1, receiving and/or processing the response message may cause the receiver circuit 120 to not schedule any new work, and therefore may allow the high latency path 150 to be drained of its pending work. Once the high latency path 150 is drained, the receiver circuit 120 may switch from the high latency path 150 to the low latency path 170.

Figure 3:
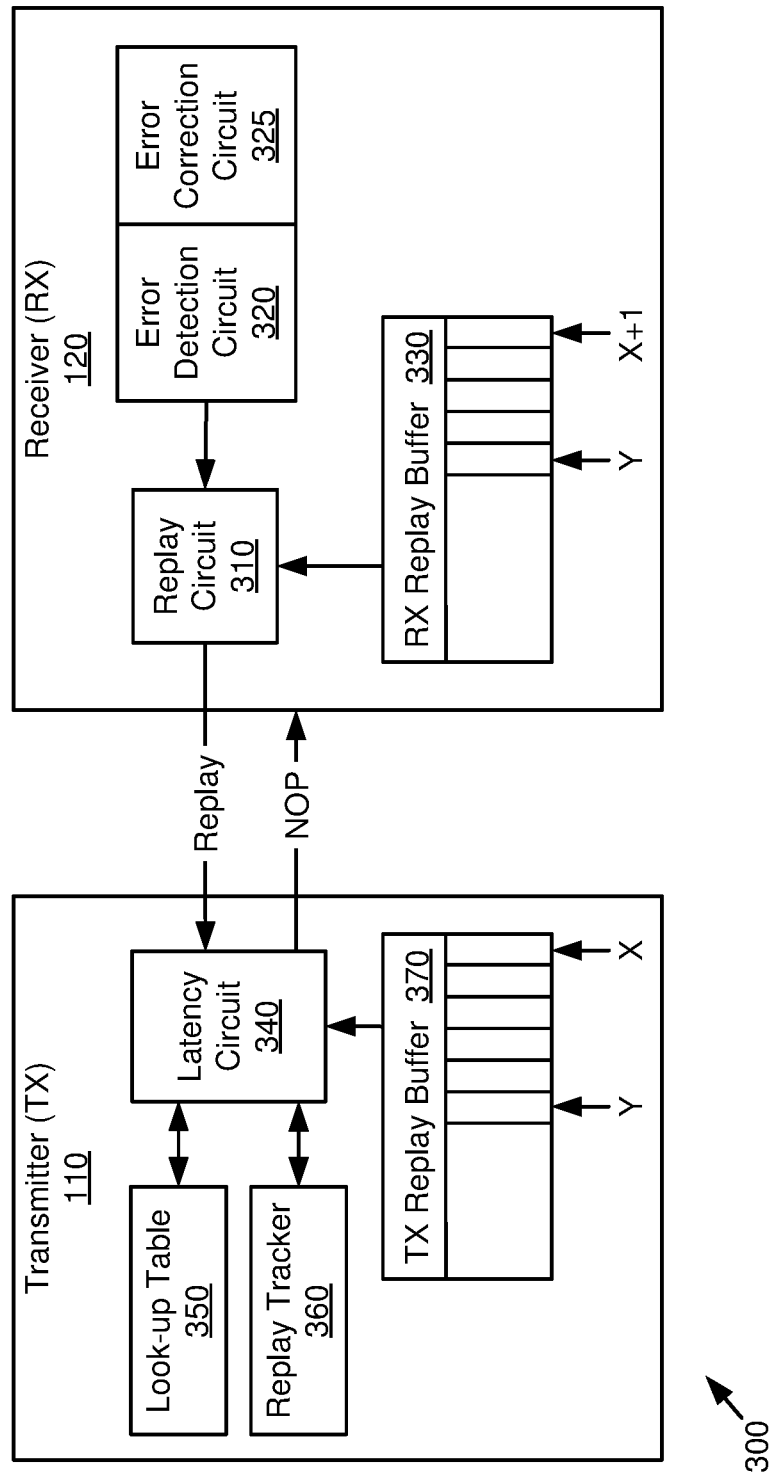
FIG. 3 is a block diagram of an example system in accordance with one or more embodiments.

FIGS. 3-4—Example System and Operation

Referring now to FIG. 3, shown is a block diagram of an example system 300 in accordance with one or more embodiments. In some embodiments, the system 300 may correspond generally to all or a part of the system 100 (shown in FIG. 1). However, in other embodiments, the system 300 may be distinct or separate from the system 100.

As shown, the system 100 may include a transmitter circuit 110 that transmits data units (e.g., flit, packet, block, etc.) to a receiver circuit 120 via a link. In some embodiments, the receiver circuit 120 may include a replay circuit 310, an error detection circuit 320, an error correction circuit 325, and a receiver (RX) replay buffer 330. Further, the transmitter circuit 110 may include a latency circuit 340, a look-up table 350, a replay tracker 360, and a transmitter (TX) replay buffer 370.

In one or more embodiments, the TX replay buffer 370 may store a data unit before it is transmitted, and may retain the stored data unit until it has been positively acknowledged by the receiver circuit 120. Once an acknowledgement arrives from the receiver circuit 120 for that data unit, it can be removed from the TX replay buffer 370. However, if the data unit is not acknowledged, then that data unit and any data units transmitted after it are retransmitted or "replayed" out of the TX replay buffer 370. The RX replay buffer 330 may store received data units, and the error detection circuit 320 may detect errors in the received data units. For example, incoming communications may be error correction coded (ECC), and the error detection circuit 320 may perform error checking (e.g., a cyclic redundancy checksum (CRC) process).

In some embodiments, if the error detection circuit 320 detects an error in a received data element, the error correction circuit 325 may attempt to correct the error (e.g., using a forward error correction (FEC) process). Further, if the detected error cannot be corrected, the replay circuit 310 may determine whether the RX replay buffer 330 has sufficient available space for a replay process. If it is determined that the RX replay buffer 330 has sufficient available space, the replay circuit 310 may transmit a replay signal to the transmitter 110. The replay signal may identify a particular data unit that had an uncorrectable error, and therefore needs to be replayed by re-transmitting the erroneous data unit and the following data units to the receiver circuit 120. In some examples, the replay signal may be a selective negative-acknowledgement signal (NACK) of the erroneous data unit.

In some embodiments, the latency circuit 340 may receive the replay signal, and in response may determine an occupancy metric for the TX replay buffer 370. For example, assume that the replay signal identifies an erroneous flit having a sequence number X. Assume further, that the set of flits that follow the erroneous flit are identified by sequence number that increase consecutively. Thus, as illustrated in FIG. 3, the TX replay buffer 370 may store a set of flits having sequence numbers X to Y, and the RX replay buffer 330 may store a set of flits having sequence numbers X+1 to Y. Accordingly, in this example, (Y−X) flits will have to be removed from the RX replay buffer 330 in order for it to become empty.

In some embodiments, the latency circuit 340 may determine an occupancy metric equal to the drain time (DT) to empty the RX replay buffer 330 using only skip ordered sets (SOS). For example, assume that each SOS drains 0.5 flits, that a SOS is inserted every 750 flits, and that each flit takes 2 ns to drain from the RX replay buffer 330. In this example, the drain time DT is equal to ((Y−X)*750*2)*2 ns, and indicates the time needed to empty the RX replay buffer 330 if using only on SOSs. Depending on the value of the occupancy metric (e.g., drain time DT), a replay operation may result in one of the following three possible outcomes. In a first outcome, if the next replay happens on average before the drain time is up, then the receiver is perpetually using the RX replay buffer 330, thereby incurring a latency penalty, and likely resulting in a full sequence replay once the RX replay buffer 330 fills up. In a second possible outcome, if the next replay on average requires a period longer than DT but less than (2*T), then the RX replay buffer 330 will empty. However, the receiver may spend more than 50% of the time reading out of the RX replay buffer 330. In a third possible outcome, it may be possible to extend the ranges to (2*T) to (4*T) for 25% of the time reading out of the RX replay buffer 330.

In one or more embodiments, the replay tracker 360 may include hardware (e.g., circuitry) and/or software logic to track statistics associated with data transmitted from the transmitter circuit 110 to the receiver circuit 120. For example, the replay tracker 360 may calculate or otherwise determine the average number of received data units between successive replay signals (AvgR) sent by the replay circuit 310. In some examples, the average number AvgR may be computed as an average number of flits received between successive replay signals, and may be computed across a time period defined by a given number of consecutive replay signals (e.g., 16 replay signals, 32 replay signals, and so forth).

In one or more embodiments, the latency circuit 340 may use the occupancy metric (e.g., drain time DT) and the average number AvgR to identify a particular entry of the look-up table 350. In some embodiments, the look-up table 350 may include multiple entries that each indicate a different rate or number of NOP messages to be inserted into the data transmitted to the receiver circuit 120 (also referred to as an "NOP insertion rate"). The latency circuit 340 may then insert NOP messages (e.g., NOP flits) into the transmitted data according to the determined NOP insertion rate.

Referring now to FIG. 4, shown is an example operation 400 for identifying a particular entry of the look-up table 350. As shown in FIG. 4, the example look-up table 350 may include multiple entries, with each entry including an index value 410 and an NOP insertion value 420. The index value 410 may be a fraction or a multiple of the average number AvgR (i.e., the average number of received data units between successive replay signals). Further, the index value 410 may indicate one or more range boundaries (e.g., upper bound, lower bound, or both) for a range associated with the entry. For example, as shown in FIG. 4, the index value 410 of the first entry may define an associated first range having a lower bound at the average number AvgR. In another example, the index value 410 of the second entry may define an associated second range having a lower bound equal to the average number AvgR divided by two, and having an upper bound equal to the average number AvgR. In yet another example, the index value 410 of the third entry may define an associated third range having a lower bound equal to the average number AvgR divided by four, and having an upper bound equal to the average number AvgR divided by two.

In some embodiments, the latency circuit 340 may calculate the drain time DT as described above, and may match 430 the calculated DT to a range associated with a particular entry of the look-up table 350 (e.g., by matching 430 to the third range associated with the third entry). Further, the latency circuit 340 may determine the NOP insertion rate by reading the NOP insertion value 420 of the matching entry. The latency circuit 340 may then insert NOP messages (e.g., NOP flits) into the data transmitted to the receiver circuit 120 according to the determined NOP insertion rate. For example, if DT matches the third entry of the look-up table 350 having an NOP insertion value 420 of 6, then the latency circuit 340 may insert at least 6 NOP flits for every 100 flits that are transmitted. The latency circuit 340 may continue this insertion until the earliest of receiving the next selective replay signal, or when the sequence number Y has been de-allocated from the TX retry buffer 370. Further, if a full sequence replay command is received (indicating that the RX replay buffer 330 is full or has lost tracking), then the transmitter circuit 110 may continue performing the replay process, and/or may use a higher NOP insertion rate until an ACK for the sequence number Y is received.

It is noted that, while FIG. 4 illustrates one technique for determining the NOP insertion rate using the look-up table 350, embodiments are not limited in this regard. For example, it is contemplated that the NOP insertion rate may be calculated using a formula or algorithm that uses the average number AvgR and/or any occupancy metric as input parameters. In another example, it is contemplated that the entry of the look-up table 350 may be selected using other techniques (e.g., by matching to a closest index value).

Figure 5:
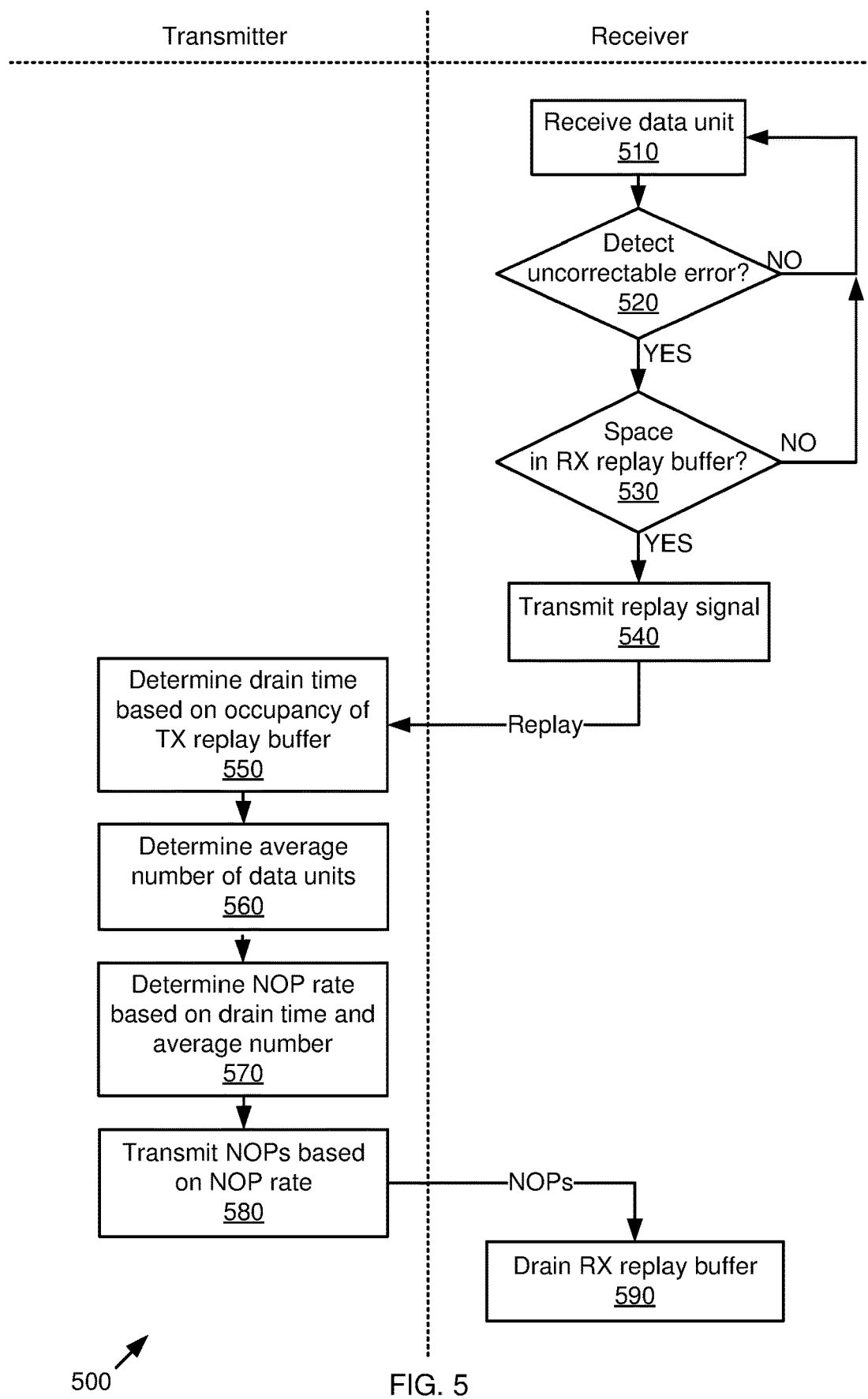
FIG. 5 is a flow diagram of an example method in accordance with one or more embodiments.

FIG. 5—Example Method

Referring now to FIG. 5, shown is a flow diagram of a method 500, in accordance with one or more embodiments. In various embodiments, the method 500 may be performed by processing logic (e.g., transmitter circuit 110, receiver circuit 120, replay circuit 310, and latency circuit 340 shown in FIG. 3) that may include hardware (e.g., processing device, circuitry, dedicated logic, programmable logic, microcode, etc.), software and/or firmware (e.g., instructions run on a processing device), or a combination thereof. In firmware or software embodiments, the method 500 may be implemented by computer executed instructions stored in a non-transitory machine-readable medium, such as an optical, semiconductor, or magnetic storage device. The machine-readable medium may store data, which if used by at least one machine, causes the at least one machine to fabricate at least one integrated circuit to perform a method.

Block 510 may include receiving a data unit (e.g., a flit) by a receiver. Decision block 520 may include determining whether an uncorrectable error has been detected in the received data unit. If not, the method 500 may return to block 510. Otherwise, if it is determined that an uncorrectable error has been detected in the received data unit, then the method 500 may continue at decision block 530, including determining whether a receiver replay buffer has sufficient space for a replay process. If not, the method 500 may return to block 510. Otherwise, if it is determined that the receiver replay buffer has sufficient space, then the method 500 may continue at block 540, including transmitting a replay signal to a transmitter. For example, referring to FIG. 3, the error detection circuit 320 may detect an error in a received flit. The replay circuit 310 may determine that the RX replay buffer 330 has sufficient available space for a replay process, and may then transmit a replay signal to the transmitter 110.

Referring again to FIG. 5, block 550 may include determining a drain time based on an occupancy metric of the transmitter replay buffer. Block 560 may include determining an average number of data units that have been transmitted to the receiver. Block 570 may include determining an NOP insertion rate based on the drain time (determined at block 550) and the average number of data units (determined at block 560). For example, referring to FIG. 3, the latency circuit 340 may calculate a drain time (DT) based on a current occupancy of the TX replay buffer 370. Further, the latency circuit 340 may access or read the replay tracker 360 to determine the average number of received data units between successive replay signals (AvgR) sent by the replay circuit 310. The latency circuit 340 may then determine an NOP insertion rate based on the drain time DT and the average number AvgR (e.g., by matching 430 the drain time to a particular entry of the look-up table 350, as shown in FIG. 4).

Referring again to FIG. 5, block 580 may include transmitting NOP messages to the receiver circuit 120 according to the NOP insertion rate (determined at block 570). Block 590 may include draining the receiver replay buffer using the NOP messages received from the transmitter. After block 590, the method 500 may be completed. For example, referring to FIG. 3, the latency circuit 340 may insert NOP messages (e.g., NOP flits) into the data transmitted to the receiver circuit 120 according to the determined NOP insertion rate. Receiving and/or processing the NOP messages may allow the RX replay buffer 330 to be drained.

Figure 6:
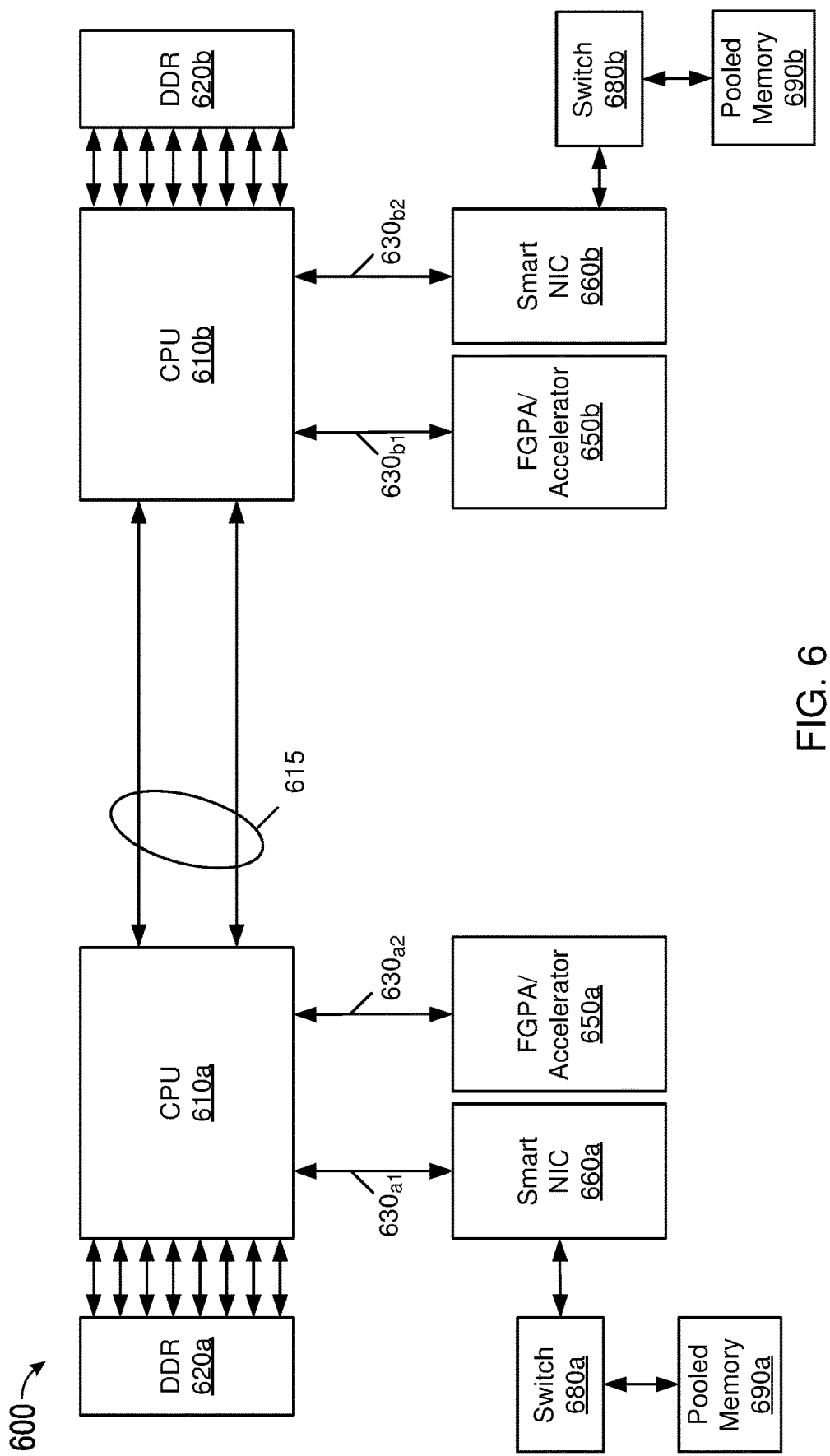
FIG. 6 is a block diagram of an example system in accordance with one or more embodiments.

FIG. 6—Example System

Embodiments may be implemented in a variety of other computing platforms. Referring now to FIG. 6, shown is a block diagram of a system in accordance with another embodiment. As shown in FIG. 6, a system 600 may be any type of computing device, and in one embodiment may be a server system such as an edge platform. In the embodiment of FIG. 6, system 600 includes multiple CPUs 610*a,b* that in turn couple to respective system memories 620*a,b* which in embodiments may be implemented as double data rate (DDR) memory. Note that CPUs 610 may couple together via an interconnect system 615, which in an embodiment can be an optical interconnect that communicates with optical circuitry (which may be included in or coupled to CPUs 610).

To enable coherent accelerator devices and/or smart adapter devices to couple to CPUs 610 by way of potentially multiple communication protocols, a plurality of interconnects 630*a*1-*b*2 may be present. In an embodiment, each interconnect 630 may be a given instance of a Compute Express Link (CXL) interconnect.

In the embodiment shown, respective CPUs 610 couple to corresponding field programmable gate arrays (FPGAs)/accelerator devices 650*a,b* (which may include graphics processing units (GPUs), in one embodiment. In addition CPUs 610 also couple to smart network interface circuit (MC) devices 660 *a,b*. In turn, smart MC devices 660*a,b* couple to switches 680*a,b* that in turn couple to a pooled memory 690*a,b* such as a persistent memory.

Figure 7:
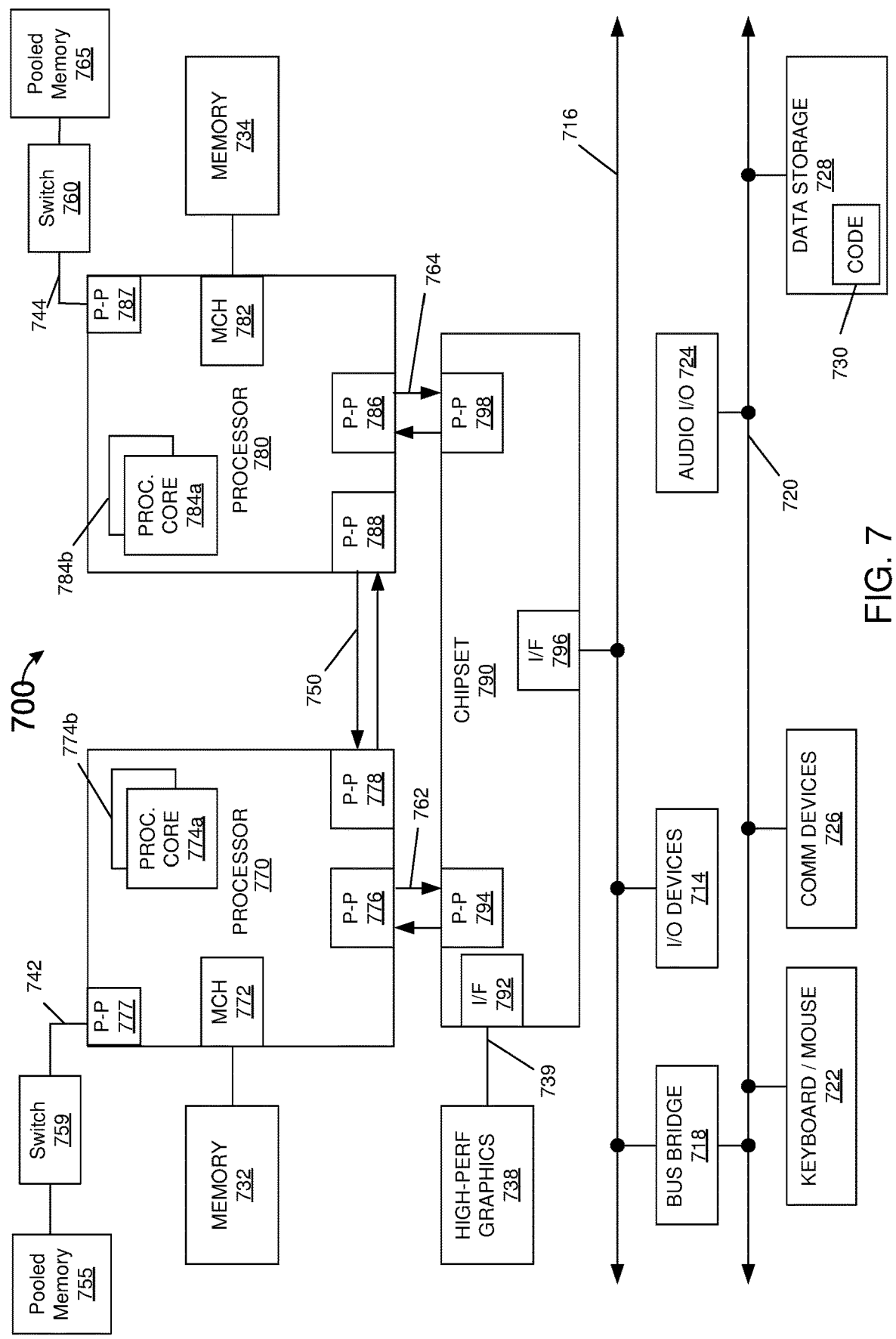
FIG. 7 is a block diagram of an example system in accordance with one or more embodiments.

FIG. 7—Example System

Referring now to FIG. 7, shown is a block diagram of a system in accordance with another embodiment such as an edge platform. As shown in FIG. 7, multiprocessor system 700 includes a first processor 770 and a second processor 780 coupled via an interconnect 750, which in an embodiment can be an optical interconnect that communicates with optical circuitry (which may be included in or coupled to processors 770). As shown in FIG. 7, each of processors 770 and 780 may be many core processors including representative first and second processor cores (i.e., processor cores 774*a* and 774*b* and processor cores 784*a* and 784*b*).

In the embodiment of FIG. 7, processors 770 and 780 further include point-to point interconnects 777 and 787, which couple via interconnects 742 and 744 (which may be CXL buses) to switches 759 and 760. In turn, switches 759, 760 couple to pooled memories 755 and 765.

Still referring to FIG. 7, first processor 770 further includes a memory controller hub (MCH) 772 and point-to-point (P-P) interfaces 776 and 778. Similarly, second processor 780 includes a MCH 782 and P-P interfaces 786 and 788. As shown in FIG. 7, MCH's 772 and 782 couple the processors to respective memories, namely a memory 732 and a memory 734, which may be portions of system memory (e.g., DRAM) locally attached to the respective processors. First processor 770 and second processor 780 may be coupled to a chipset 790 via P-P interconnects 776 and 786, respectively. As shown in FIG. 7, chipset 790 includes P-P interfaces 794 and 798.

Furthermore, chipset 790 includes an interface 792 to couple chipset 790 with a high performance graphics engine 738, by a P-P interconnect 739. As shown in FIG. 7, various input/output (I/O) devices 714 may be coupled to first bus 716, along with a bus bridge 718 which couples first bus 716 to a second bus 720. Various devices may be coupled to second bus 720 including, for example, a keyboard/mouse 722, communication devices 726 and a data storage unit 728 such as a disk drive or other mass storage device which may include code 730, in one embodiment. Further, an audio I/O 724 may be coupled to second bus 720.

Figure 8:
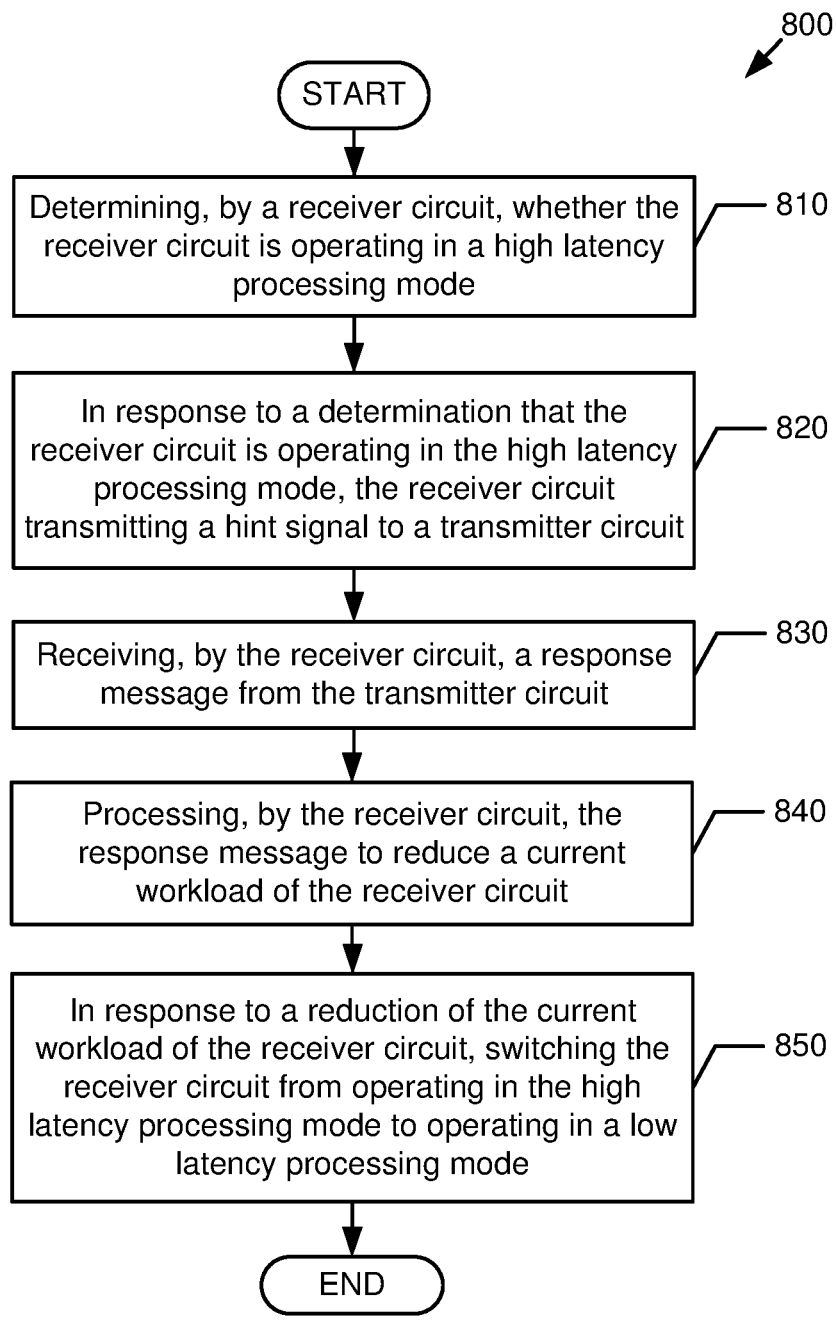
FIG. 8 is a flow diagram of an example method in accordance with one or more embodiments.

FIG. 8—Example Receiver Method

Referring now to FIG. 8, shown is a flow diagram of a method 800 performed by a receiver, in accordance with one or more embodiments. In various embodiments, the method 800 may be performed by processing logic (e.g., receiver circuit 120, and hint circuit 140 shown in FIG. 1) that may include hardware (e.g., processing device, circuitry, dedicated logic, programmable logic, microcode, etc.), software and/or firmware (e.g., instructions run on a processing device), or a combination thereof. In firmware or software embodiments, the method 800 may be implemented by computer executed instructions stored in a non-transitory machine-readable medium, such as an optical, semiconductor, or magnetic storage device. The machine-readable medium may store data, which if used by at least one machine, causes the at least one machine to fabricate at least one integrated circuit to perform a method.

Block 810 may include determining, by a receiver circuit, whether the receiver circuit is operating in a high latency processing mode. Block 820 may include, in response to a determination that the receiver circuit is operating in the high latency processing mode, the receiver circuit transmitting a hint signal to a transmitter circuit.

Block 830 may include receiving, by the receiver circuit, a response message from the transmitter circuit. Block 840 may include processing, by the receiver circuit, the response message to reduce a current workload of the receiver circuit. Block 850 may include, in response to a reduction of the current workload of the receiver circuit, switching the receiver circuit from operating in the high latency processing mode to operating in a low latency processing mode.

For example, referring to FIG. 1, the hint circuit 140 of the receiver circuit 120 may transmit a hint message in response to determining that the receiver circuit 120 is operating in the high latency operating mode and has not sent any hint message in a recent period. The receiver circuit 120 may receive a response message that was transmitted by the response circuit 130 in response to the hint message from the hint circuit 140. Receiving and/or processing the response message may cause the receiver circuit 120 to not schedule any new work, and may therefore allow the high latency path 150 to be drained of its pending work.

Figure 9:
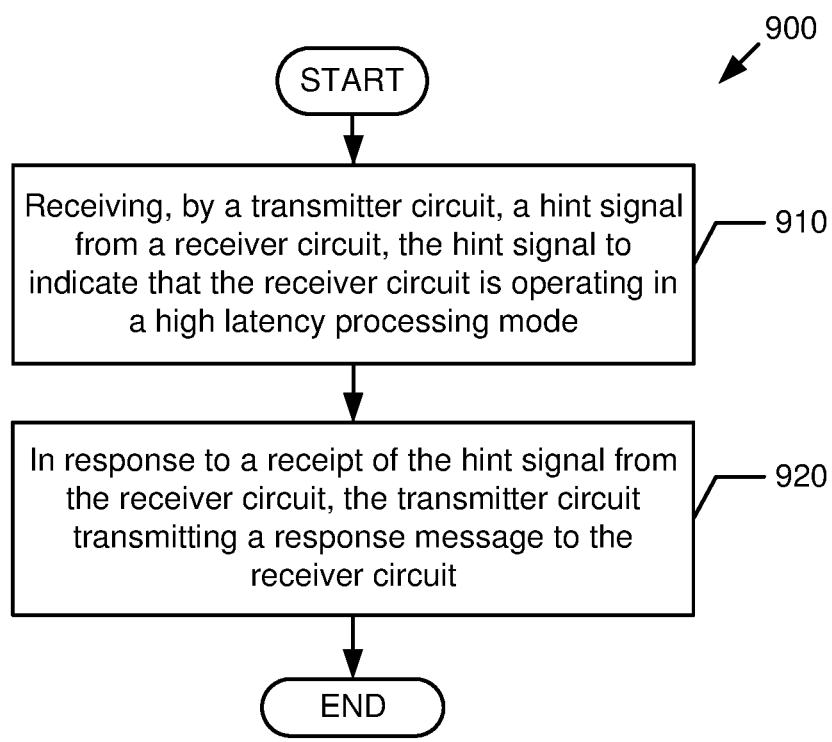
FIG. 9 is a flow diagram of an example method in accordance with one or more embodiments.

FIG. 9—Example Transmitter Method

Referring now to FIG. 9, shown is a flow diagram of a method 900 performed by a transmitter circuit, in accordance with one or more embodiments. In various embodiments, the method 900 may be performed by processing logic (e.g., transmitter circuit 110, and response circuit 130 shown in FIG. 1) that may include hardware (e.g., processing device, circuitry, dedicated logic, programmable logic, microcode, etc.), software and/or firmware (e.g., instructions run on a processing device), or a combination thereof. In firmware or software embodiments, the method 900 may be implemented by computer executed instructions stored in a non-transitory machine-readable medium, such as an optical, semiconductor, or magnetic storage device. The machine-readable medium may store data, which if used by at least one machine, causes the at least one machine to fabricate at least one integrated circuit to perform a method.

Block 910 may include receiving, by a transmitter circuit, a hint signal from a receiver circuit, the hint signal to indicate that the receiver circuit is operating in a high latency processing mode. Block 920 may include, in response to a receipt of the hint signal from the receiver circuit, the transmitter circuit transmitting a response message to the receiver circuit.

For example, referring to FIG. 1, the response circuit 130 may receive from the hint circuit 140 a hint message indicating that the receiver circuit is operating in a high latency processing mode. In response to the hint message, the response circuit 130 may transmit a response message to be transmitted to the receiver circuit 120.

Figure 10:
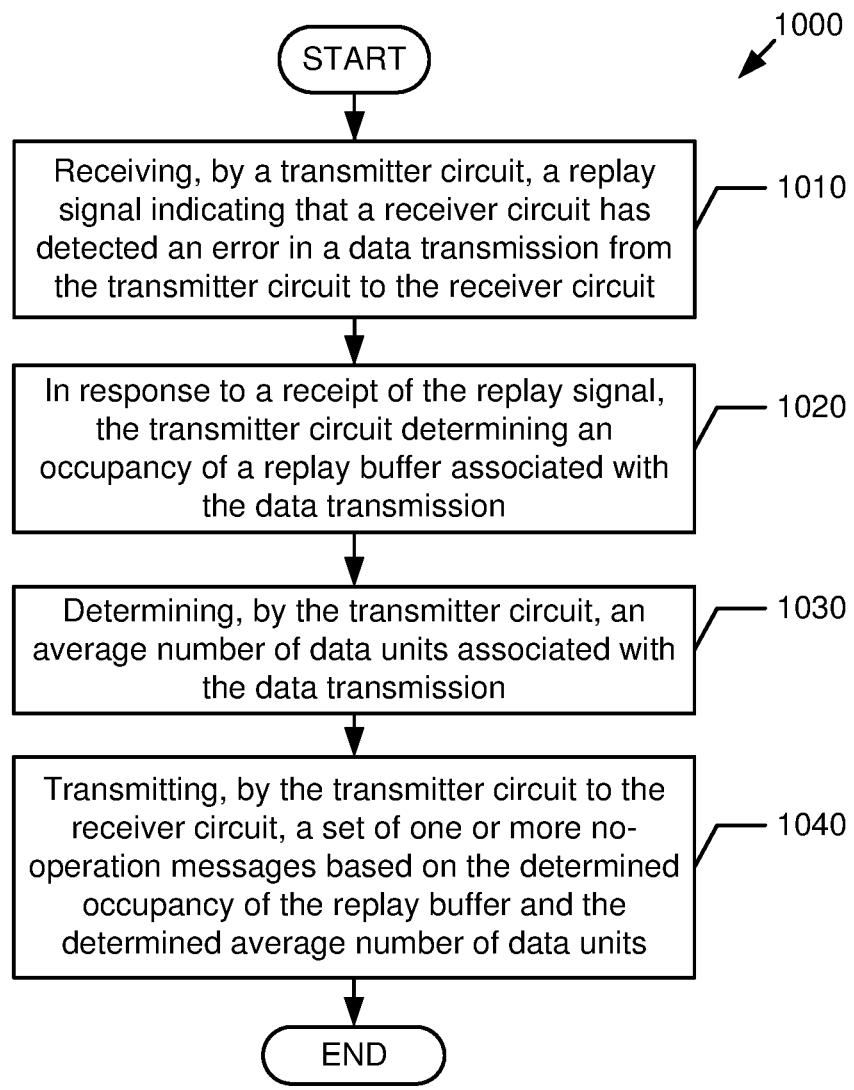
FIG. 10 is a flow diagram of an example method in accordance with one or more embodiments.

FIG. 10—Example Transmitter Method

Referring now to FIG. 10, shown is a flow diagram of a method 1000 performed by a transmitter circuit, in accordance with one or more embodiments. In various embodiments, the method 1000 may be performed by processing logic (e.g., transmitter circuit 110 and latency circuit 340 shown in FIG. 3) that may include hardware (e.g., processing device, circuitry, dedicated logic, programmable logic, microcode, etc.), software and/or firmware (e.g., instructions run on a processing device), or a combination thereof. In firmware or software embodiments, the method 1000 may be implemented by computer executed instructions stored in a non-transitory machine-readable medium, such as an optical, semiconductor, or magnetic storage device. The machine-readable medium may store data, which if used by at least one machine, causes the at least one machine to fabricate at least one integrated circuit to perform a method.

Block 1010 may include receiving, by a transmitter circuit, a replay signal indicating that a receiver circuit has detected an error in a data transmission from the transmitter circuit to the receiver circuit. Block 1020 may include, in response to a receipt of the replay signal, the transmitter circuit determining an occupancy of a replay buffer associated with the data transmission.

Block 1030 may include determining, by the transmitter circuit, an average number of data units associated with the data transmission. Block 1040 may include transmitting, by the transmitter circuit to the receiver circuit, a set of one or more no-operation messages based on the determined occupancy of the replay buffer and the determined average number of data units.

For example, referring to FIG. 3, the latency circuit 340 of the transmitter circuit 110 may receive a replay signal from a replay circuit 310 of the receiver circuit 120. The latency circuit 340 may calculate a drain time (DT) based on a current occupancy of the transmitter replay buffer 370, and may determine the average number of received data units between successive replay signals (AvgR) sent by the replay circuit 310. The latency circuit 340 may then determine an NOP insertion rate based on the drain time DT and the average number AvgR. Further, the latency circuit 340 may insert NOP messages (e.g., NOP flits) into the data transmitted to the receiver circuit 120 according to the determined NOP insertion rate.

Figure 11:
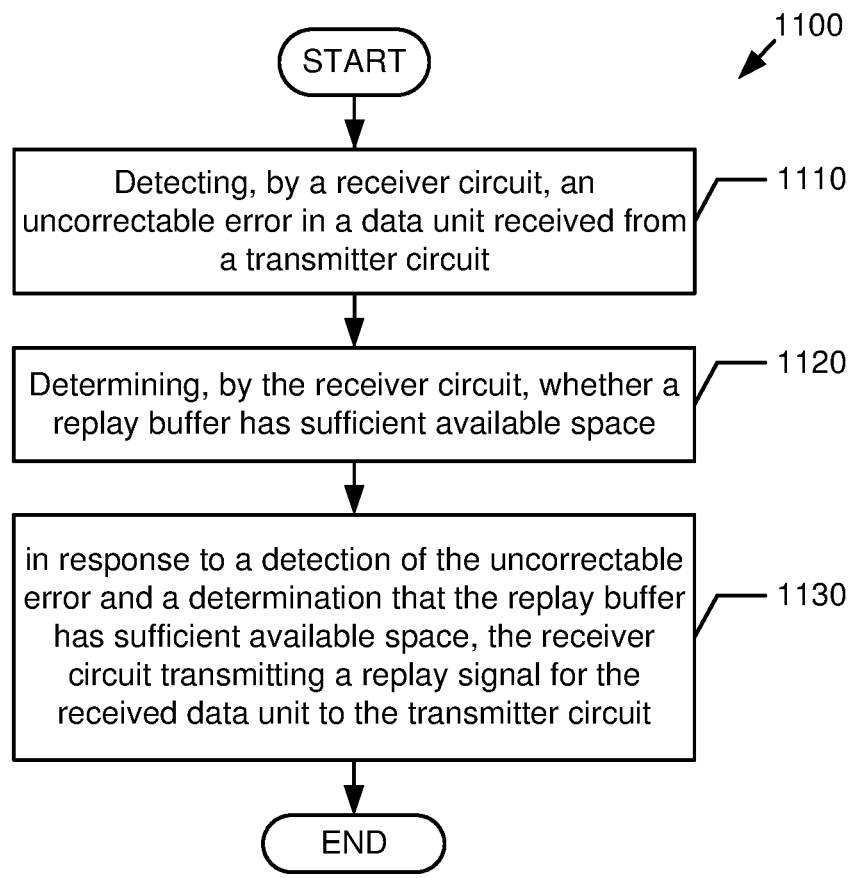
FIG. 11 is a flow diagram of an example method in accordance with one or more embodiments.

FIG. 11—Example Receiver Method

Referring now to FIG. 11, shown is a flow diagram of a method 1100 performed by a receiver circuit, in accordance with one or more embodiments. In various embodiments, the method 1100 may be performed by processing logic (e.g., transmitter circuit 110, and replay circuit 310 shown in FIG. 3) that may include hardware (e.g., processing device, circuitry, dedicated logic, programmable logic, microcode, etc.), software and/or firmware (e.g., instructions run on a processing device), or a combination thereof. In firmware or software embodiments, the method 1100 may be implemented by computer executed instructions stored in a non-transitory machine-readable medium, such as an optical, semiconductor, or magnetic storage device. The machine-readable medium may store data, which if used by at least one machine, causes the at least one machine to fabricate at least one integrated circuit to perform a method.

Block 1110 may include detecting, by a receiver circuit, an uncorrectable error in a data unit received from a transmitter circuit. Block 1120 may include determining, by the receiver circuit, whether a replay buffer has sufficient available space. Block 1130 may include, in response to a detection of the uncorrectable error and a determination that the replay buffer has sufficient available space, the receiver circuit transmitting a replay signal for the received data unit to the transmitter circuit.

For example, referring to FIG. 3, the error detection circuit 320 of the receiver circuit 120 may detect an error in a received flit. The replay circuit 310 of the receiver circuit 120 may determine that the receiver replay buffer 330 has sufficient available space for a replay process, and may then transmit a replay signal to the transmitter 110. The latency circuit 340 may then determine an NOP insertion rate (e.g., using method 1000 shown in FIG. 10), and may transmit NOP messages to the receiver circuit 120 according to the determined NOP insertion rate.

Figure 12:
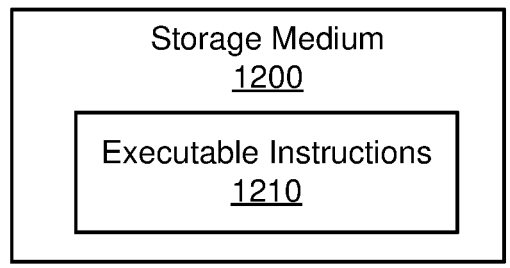
FIG. 12 is an illustration of an example storage medium in accordance with one or more embodiments.

FIG. 12—Example Storage Medium

Referring now to FIG. 12, shown is a storage medium 1200 storing executable instructions 1210. In some embodiments, the storage medium 1200 may be a non-transitory machine-readable medium, such as an optical medium, a semiconductor, a magnetic storage device, and so forth. The executable instructions 1210 may be executable by a processing device. Further, the executable instructions 1210 may be used by at least one machine to fabricate at least one integrated circuit to perform one or more of the methods and/or operations shown in FIGS. 1-11.

The following clauses and/or examples pertain to further embodiments.

In Example 1, an apparatus for data communication may include a receiver circuit to: in response to a determination that the receiver circuit is in a high latency processing mode, transmit a hint signal to a transmitter circuit; receive a response message from the transmitter circuit; process the response message to reduce a current workload of the receiver circuit; and switch the receiver circuit from the high latency processing mode to a low latency processing mode.

In Example 2, the subject matter of Example 1 may optionally include that the receiver circuit includes an error correction circuit, and the high latency processing mode is to process received data using the error correction circuit of the receiver circuit.

In Example 3, the subject matter of Examples 1-2 may optionally include that the low latency processing mode is to process the received data without using the error correction circuit of the receiver circuit.

In Example 4, the subject matter of Examples 1-3 may optionally include that the hint signal is one selected from an acknowledgment (ACK) and a negative acknowledgement (NACK).

In Example 5, the subject matter of Examples 1-3 may optionally include that the hint signal is one selected from a special bit in a flit header and a pre-identified flit encoding.

In Example 6, the subject matter of Examples 1-5 may optionally include that the receiver circuit is to: identify a number of data units received from the transmitter circuit since a previous hint signal was transmitted by the receiver circuit to the transmitter circuit; compare the number of data units to a threshold value; and transmit the hint signal in response to a determination that the number of data units exceeds the threshold value.

In Example 7, the subject matter of Examples 1-6 may optionally include that the received data units are flits, and that the threshold value is adjustable by a configuration setting.

In Example 8, the subject matter of Examples 1-7 may optionally include that the receiver circuit is to: detect an uncorrectable error in a received data unit; determine whether a replay buffer has sufficient available space; and, in response to a detection of the uncorrectable error and a determination that the replay buffer has sufficient available space, transmit a replay signal for the received data unit to the transmitter circuit.

In Example 9, a method for data communication may include: receiving, by a transmitter circuit, a replay signal indicating that a receiver circuit has detected an error in a data transmission from the transmitter circuit to the receiver circuit; in response to a receipt of the replay signal, the transmitter circuit determining an occupancy of a replay buffer of the transmitter circuit; determining, by the transmitter circuit, an average number of data units associated with the data transmission; and transmitting, by the transmitter circuit to the receiver circuit, a set of one or more no-operation messages based on the determined occupancy of the replay buffer and the determined average number of data units.

In Example 10, the subject matter of Example 9 may optionally include that the data units are flits, and that the average number of data units is an average number of flits over a plurality of replay signals.

In Example 11, the subject matter of Examples 9-10 may optionally include: detecting, by the receiver circuit, an uncorrectable error in a received data unit; determining, by the receiver circuit, whether the replay buffer has sufficient available space; and in response to a detection of the uncorrectable error and a determination that the replay buffer has sufficient available space, the receiver circuit transmitting the replay signal to the transmitter circuit.

In Example 12, the subject matter of Examples 9-11 may optionally include: determining a drain time based on the occupancy of the replay buffer; comparing the drain time to a plurality of index values of a look-up table, wherein the plurality of index values are based on the average number of data units; based on the comparing, selecting an entry of the look-up table; and determining, based on the entry of the look-up table, a total number of no-operation messages to be included in the transmitted set.

In Example 13, the subject matter of Examples 9-12 may optionally include: receiving, by the transmitter circuit, a hint signal from a receiver circuit, the hint signal to indicate that the receiver circuit is operating in a high latency processing mode; and in response to a receipt of the hint signal from the receiver circuit, the transmitter circuit transmitting a response message to the receiver circuit.

In Example 14, the subject matter of Examples 9-13 may optionally include that the replay signal is a selective negative acknowledgement (NACK).

In Example 15, a computing device may include one or more processors, and a memory having stored therein a plurality of instructions that when executed by the one or more processors, cause the computing device to perform the method of any of Examples 9 to 14.

In Example 16, a machine readable medium may have stored thereon data, which if used by at least one machine, causes the at least one machine to fabricate at least one integrated circuit to perform a method according to any one of Examples 9 to 14.

In Example 17, an electronic device may include means for performing the method of any of Examples 9 to 14.

In Example 18, a system for data communication may include: a transmitter circuit, and a receiver circuit coupled to the transmitter circuit via a communication link. The receiver circuit may be to, in response to a determination that the receiver circuit is in a high latency processing mode, transmit a hint signal to the transmitter circuit. The transmitter circuit may be to, in response to a receipt of the hint signal, transmit a response message to the receiver circuit. The receiver circuit may be to process the response message to cause a reduction of a current workload of the receiver circuit. The receiver circuit may be to, responsive to the reduction of the current workload, switch the receiver circuit from the high latency processing mode to a low latency processing mode.

In Example 19, the subject matter of Example 18 may optionally that the receiver circuit includes an error correction circuit, where the high latency processing mode comprises use of a first processing path that includes the error correction circuit, and where the low latency processing mode comprises use of a second processing path that does not include the error correction circuit.

In Example 20, the subject matter of Examples 18-19 may optionally that the hint signal is an acknowledgment (ACK) or a negative acknowledgement (NACK) with a value of 0.

In Example 21, the subject matter of Examples 18-19 may optionally that the hint signal is one selected from a special bit in a flit header and a pre-identified flit encoding.

In Example 22, the subject matter of Examples 18-21 may optionally that the receiver circuit is further to: identify a number of data units received from the transmitter circuit since a previous hint signal was transmitted by the receiver circuit to the transmitter circuit; compare the number of data units to a threshold value; and transmit, the hint signal to the transmitter circuit in response to a determination that the number of data units exceeds the threshold value.

In Example 23, the subject matter of Examples 18-22 may optionally that the transmitter circuit is further to: receive a replay signal indicating that the receiver circuit has detected an error in a data transmission from the transmitter circuit to the receiver circuit; in response to a receipt of the replay signal, determine an occupancy of a replay buffer of the transmitter circuit; determine an average number of data units associated with the data transmission; and transmit, to the receiver circuit, a set of one or more no-operation messages based on the determined occupancy of the replay buffer and the determined average number of data units.

In Example 24, an apparatus for data communication may include: means for receiving a replay signal, the replay signal to indicate an error in a data transmission; means for, in response to a receipt of the replay signal, determining an occupancy of a replay buffer; means for determining an average number of data units associated with the data transmission; and means for transmitting a set of one or more no-operation messages based on the determined occupancy of the replay buffer and the determined average number of data units.

In Example 25, the subject matter of Example 24 may optionally include that the data units are flits, and that the average number of data units is an average number of flits over a plurality of replay signals.

In Example 26, the subject matter of Examples 24-25 may optionally include: means for detecting an uncorrectable error in a received data unit; means for determining whether the replay buffer has sufficient available space; and means for, in response to a detection of the uncorrectable error and a determination that the replay buffer has sufficient available space, transmitting the replay signal.

In Example 27, the subject matter of Examples 24-26 may optionally include: means for determining a drain time based on the occupancy of the replay buffer; means for comparing the drain time to a plurality of index values of a look-up table, where the plurality of index values are based on the average number of data units; means for, based on the comparing, selecting an entry of the look-up table; and means for determining, based on the entry of the look-up table, a total number of no-operation messages to be included in the transmitted set.

In Example 28, the subject matter of Examples 24-27 may optionally include: means for receiving a hint signal from a receiver circuit, the hint signal to indicate use of a high latency processing mode; and means for transmitting a response message in response to a receipt of the hint signal.

In Example 29, the subject matter of Examples 24-28 may optionally include that the replay signal is a selective negative acknowledgement (NACK).

Some embodiments described herein may allow a receiver to switch over to the low latency operating mode deterministically. For example, some embodiments may provide include a mechanism for a receiver to send a hint signal to cause a transmitter to insert no-operation (NOP) message when the receiver is in the high latency operating mode. The NOP message may allow the receiver to switch over to the low latency operating mode. Further, some embodiments described herein may provide a mechanism for the transmitter to monitor replay characteristics and adjust the number of transmitted NOP messages, and thereby improve utilization of link throughput and reduce the chances of a full replay.

Note that, while FIGS. 1-12 illustrate various example implementations, other variations are possible. For example, the examples shown in FIGS. 1-12 are provided for the sake of illustration, and are not intended to limit any embodiments. Specifically, while embodiments may be shown in simplified form for the sake of clarity, embodiments may include any number and/or arrangement of components. For example, it is contemplated that some embodiments may include any number of components in addition to those shown, and that different arrangement of the components shown may occur in certain implementations. Furthermore, it is contemplated that specifics in the examples shown in FIGS. 1-12 may be used anywhere in one or more embodiments.

Understand that various combinations of the above examples are possible. Embodiments may be used in many different types of systems. For example, in one embodiment a communication device can be arranged to perform the various methods and techniques described herein. Of course, the scope of the present invention is not limited to a communication device, and instead other embodiments can be directed to other types of apparatus for processing instructions, or one or more machine readable media including instructions that in response to being executed on a computing device, cause the device to carry out one or more of the methods and techniques described herein.

References throughout this specification to "one embodiment" or "an embodiment" mean that a particular feature, structure, or characteristic described in connection with the embodiment is included in at least one implementation encompassed within the present invention. Thus, appearances of the phrase "one embodiment" or "in an embodiment" are not necessarily referring to the same embodiment. Furthermore, the particular features, structures, or characteristics may be instituted in other suitable forms other than the particular embodiment illustrated and all such forms may be encompassed within the claims of the present application.

While the present invention has been described with respect to a limited number of embodiments, those skilled in the art will appreciate numerous modifications and variations therefrom. It is intended that the appended claims cover all such modifications and variations as fall within the true spirit and scope of this present invention.

What is claimed is:

1. An apparatus comprising:
a receiver circuit to:
generate a hint signal based on operating characteristics indicating readiness to switch from a high latency processing mode to a low latency processing mode;
transmit the hint signal to a transmitter circuit when operating in a normal flit exchange phase;
receive a response message from the transmitter circuit, the response message comprising one or more no operation (NOP) flits;
process the response message to reduce a current workload of the receiver circuit; and
switch the receiver circuit from the high latency processing mode to a low latency processing mode.

2. The apparatus of claim 1, wherein the receiver circuit comprises an error correction circuit, and the high latency processing mode is to process received data using the error correction circuit of the receiver circuit.

3. The apparatus of claim 2, wherein the low latency processing mode is to process the received data without using the error correction circuit of the receiver circuit.

4. The apparatus of claim 1, wherein the hint signal is one selected from an acknowledgment (ACK) and a negative acknowledgement (NACK).

5. The apparatus of claim 1, wherein the hint signal is one selected from a special bit in a flit header and a pre-identified flit encoding.

6. The apparatus of claim 1, wherein the receiver circuit is to:
identify a number of data units received from the transmitter circuit since a previous hint signal was transmitted by the receiver circuit to the transmitter circuit;
compare the number of data units to a threshold value; and
transmit the hint signal in response to a determination that the number of data units exceeds the threshold value.

7. The apparatus of claim 6, wherein the received data units are flits, and wherein the threshold value is adjustable by a configuration setting.

8. The apparatus of claim 1, wherein the receiver circuit is to:
detect an uncorrectable error in a received data unit;
determine whether a replay buffer has sufficient available space; and
in response to a detection of the uncorrectable error and a determination that the replay buffer has sufficient available space, transmit a replay signal for the received data unit to the transmitter circuit.

9. A system comprising:
a transmitter circuit; and
a receiver circuit coupled to the transmitter circuit via a communication link,
wherein the receiver circuit is to:
generate a hint signal based on operating characteristics indicating readiness to switch from a high latency processing mode to a low latency processing mode; and
transmit the hint signal to the transmitter circuit during a normal flit exchange phase;
wherein the transmitter circuit is to, in response to a receipt of the hint signal, transmit a response message to the receiver circuit, the response message comprising one or more No Operation (NOP) flits;
wherein the receiver circuit is to process the response message to cause a reduction of a current workload of the receiver circuit, and
wherein the receiver circuit is to, responsive to the reduction of the current workload, switch the receiver circuit from the high latency processing mode to a low latency processing mode.

10. The system of claim 9, wherein the receiver circuit comprises an error correction circuit, wherein the high latency processing mode comprises use of a first processing path that includes the error correction circuit, and wherein the low latency processing mode comprises use of a second processing path that does not include the error correction circuit.

11. The system of claim 9, wherein the hint signal is an acknowledgment (ACK) or a negative acknowledgement (NACK) with a value of 0.

12. The system of claim 9, wherein the hint signal is one selected from a special bit in a flit header and a pre-identified flit encoding.

13. The system of claim 9, wherein the receiver circuit is further to:
identify a number of data units received from the transmitter circuit since a previous hint signal was transmitted by the receiver circuit to the transmitter circuit;
compare the number of data units to a threshold value; and
transmit, the hint signal to the transmitter circuit in response to a determination that the number of data units exceeds the threshold value.

14. The system of claim 9, wherein the transmitter circuit is further to:
receive a replay signal indicating that the receiver circuit has detected an error in a data transmission from the transmitter circuit to the receiver circuit;
in response to a receipt of the replay signal, determine an occupancy of a replay buffer of the transmitter circuit;
determine an average number of data units associated with the data transmission; and
transmit, to the receiver circuit, a set of one or more no-operation messages based on the determined occupancy of the replay buffer and the determined average number of data units.

* * * * *